(12) United States Patent
Hisaki et al.

(10) Patent No.: US 11,314,009 B2
(45) Date of Patent: Apr. 26, 2022

(54) DISPLAY DEVICE AND EXHIBITION APPARATUS

(71) Applicant: OMRON Corporation, Kyoto (JP)

(72) Inventors: Shohei Hisaki, Ichinomiya (JP); Junya Fujita, Ichinomiya (JP); Yoshihiko Takagi, Kyoto (JP); Yoshimasa Osumi, Kyoto (JP)

(73) Assignee: OMRON Corporation, Kyoto (JP)

( * ) Notice: Subject to any disclaimer, the term of this patent is extended or adjusted under 35 U.S.C. 154(b) by 112 days.

(21) Appl. No.: 16/755,893

(22) PCT Filed: Apr. 6, 2018

(86) PCT No.: PCT/JP2018/014778
§ 371 (c)(1),
(2) Date: Apr. 14, 2020

(87) PCT Pub. No.: WO2019/092902
PCT Pub. Date: May 16, 2019

(65) Prior Publication Data
US 2021/0373223 A1    Dec. 2, 2021

(30) Foreign Application Priority Data

Nov. 7, 2017   (JP) .............................. JP2017-214630

(51) Int. Cl.
*F21V 8/00*   (2006.01)
*G07F 9/02*   (2006.01)

(52) U.S. Cl.
CPC ......... *G02B 6/0036* (2013.01); *G02B 6/0055* (2013.01); *G02B 6/0068* (2013.01); *G07F 9/023* (2013.01)

(58) Field of Classification Search
CPC .. G02B 6/0036; G02B 6/0055; G02B 6/0068; G07F 9/023; G07F 2013/185
See application file for complete search history.

(56) References Cited

U.S. PATENT DOCUMENTS 9,367,126 B2    6/2016  Nakayama
10,379,282 B2 *  8/2019  Agemizu ............. G02B 6/0036
(Continued)

FOREIGN PATENT DOCUMENTS

CN    1878984 A    12/2006
CN  101029985 A     9/2007
(Continued)

OTHER PUBLICATIONS

Machine translation of WO 2016/006525 (Year: 2016).*
(Continued)

*Primary Examiner* — Leah Simone Macchiarolo
(74) *Attorney, Agent, or Firm* — Metrolex IP Law Group, PLLC

(57) ABSTRACT

A display device includes a transparent light guide plate having an incident surface to display a plurality of patterns viewable in different directions and at least one light source facing a part of the incident surface. The light guide plate includes, on a first surface of the light guide plate, a plurality of prisms arranged along each of the plurality of patterns. The plurality of prisms have, for each pattern, reflection surfaces that reflect light emitted from the at least one light source and entering the light guide plate through the incident surface in a direction in which the pattern is viewable.

7 Claims, 6 Drawing Sheets

(56) References Cited

U.S. PATENT DOCUMENTS

| | | | |
|---|---|---|---|
| 10,527,776 B2* | 1/2020 | Takata | G02B 6/0035 |
| 10,605,977 B2* | 3/2020 | Shinohara | G02B 6/0061 |
| 10,690,830 B2* | 6/2020 | Takagi | G02B 6/0036 |
| 2001/0049893 A1* | 12/2001 | Maas | G09F 19/12 |
| | | | 40/544 |
| 2007/0171674 A1* | 7/2007 | Deutsch | G02B 6/0076 |
| | | | 362/612 |
| 2007/0211013 A1 | 9/2007 | Uehara et al. | |
| 2008/0002432 A1 | 1/2008 | Ueno et al. | |
| 2009/0146992 A1 | 6/2009 | Fukunaga et al. | |
| 2013/0170188 A1 | 7/2013 | Choi et al. | |
| 2015/0168627 A1* | 6/2015 | Takagi | G02B 6/006 |
| | | | 362/613 |
| 2015/0235508 A1* | 8/2015 | Shinohara | G02B 6/0036 |
| | | | 463/31 |
| 2016/0054601 A1* | 2/2016 | Kitamura | G02B 6/0036 |
| | | | 349/33 |
| 2017/0115441 A1 | 4/2017 | Takata | |
| 2018/0182201 A1 | 6/2018 | Fujita et al. | |
| 2020/0312078 A1* | 10/2020 | Deshpande | G07F 9/023 |

FOREIGN PATENT DOCUMENTS

| | | |
|---|---|---|
| CN | 102254496 A | 11/2011 |
| CN | 102395039 A | 3/2012 |
| CN | 102592380 A | 7/2012 |
| CN | 205656812 U | 10/2016 |
| CN | 205900042 U | 1/2017 |
| CN | 106611571 A | 5/2017 |
| CN | 107263981 A | 10/2017 |
| JP | H09-288462 A | 11/1997 |
| JP | 2003-330395 A | 11/2003 |
| JP | 2007-183853 A | 7/2007 |
| JP | 2009-140193 A | 6/2009 |
| JP | 5674300 B2 | 2/2015 |
| KR | 10-2013-0077708 A | 7/2013 |
| WO | 2013/064971 A2 | 5/2013 |
| WO | 2016/006525 A1 | 1/2016 |
| WO | 2017/098868 A1 | 6/2017 |

OTHER PUBLICATIONS

English translation of the International Search Report ("ISR") of PCT/JP2018/014778 dated Jun. 12, 2018.
Written Opinion("WO") of PCT/JP2018/014778 dated Jun. 12, 2018.
International Preliminary Report on Patentability (Chapter II of the Patent Cooperation Treaty) of PCT/JP2018/014778 dated Sep. 25, 2018.
Yong-Long Tang et al., "Design of precise alignment orthogonal system used in micro-assembly", Optics and Precision Engineering, Jul. 15, 2012, p. 1542-1550, vol. 20, No. 7; Relevance is indicated in the (translated) CNOA issued on May 19, 2021.
Office Action (CNOA) dated May 19, 2021 in a counterpart Chinese patent application.
Office Action (CNOA) dated Oct. 9, 2020 in a counterpart Chinese patent application.

* cited by examiner

DISPLAY DEVICE AND EXHIBITION APPARATUS

FIELD

The present invention relates to a display device for displaying multiple patterns and an exhibition apparatus including the display device.

BACKGROUND

Vending machines for commonly selling multiple types of products are expected to display, for example, descriptions or advertisements corresponding to the products. A known switching display device in a vending machine includes display units provided for different products selectable in the vending machine. Each display unit includes a display member including two backlight displays arranged in parallel in a predetermined direction, front and back translucent flat light guide plates extending, behind the display member, parallel to each other from one end of the displays to the other end of the corresponding display in the predetermined direction and each including a light diffusion part in an area behind the corresponding display, and light emitters each facing an end face of the corresponding light guide plate in the predetermined direction in a selectively drivable manner (refer to, for example, Patent Literature 1).

CITATION LIST

Patent Literature

Patent Literature 1: Japanese Unexamined Patent Application Publication No. 2007-183853

SUMMARY

Technical Problem

Although the switching display device described in Patent Literature 1 selectively turns on the light emitters to switch its display, the display corresponding to the on-state light emitters will appear, irrespective of the direction in which the switching display device is viewed. In some situations, however, the display is to be switched depending on the viewing direction.

One or more aspects of the present invention are directed to a display device that can switch display patterns depending on the viewing direction.

Solution to Problem

One aspect of the present invention provides a display device. The display device includes a transparent light guide plate having an incident surface to display a plurality of patterns viewable in different directions, and at least one light source facing a part of the incident surface. The light guide plate includes, on a first surface of the light guide plate, a plurality of prisms arranged along each of the plurality of patterns. The plurality of prisms have, for each pattern, reflection surfaces that reflect light emitted from the at least one light source and entering the light guide plate through the incident surface in a direction in which the pattern is viewable.

The display device with the above structure can switch display patterns depending on the viewing direction.

In the display device, each of the patterns may be viewable in a different direction with respect to a direction orthogonal to the incident surface of the light guide plate, and each of the patterns may have an angle between the reflection surface of each of the plurality of prisms forming the pattern and the first surface of the light guide plate that is set in accordance with the direction in which the pattern is viewable.

The display device can thus switch display patterns depending on the viewing direction although each pattern is viewable in a different direction with respect to the direction orthogonal to the incident surface of the light guide plate.

In the display device, each of the patterns may be viewable in a different direction with respect to a direction parallel to the incident surface of the light guide plate, and each of the patterns may have an angle between a direction in which the reflection surface of each of the plurality of prisms forming the pattern directly faces and a direction from the reflection surface toward the at least one light source that is set in accordance with the direction in which the pattern is viewable.

The display device can thus switch display patterns depending on the viewing direction although each pattern is viewable in a different direction with respect to the direction parallel to the incident surface of the light guide plate.

In the display device, the at least one light source may include a plurality of light sources arranged in a longitudinal direction of the incident surface, and the plurality of prisms may be arranged to allow, for each pattern, the reflection surface of each of the plurality of prisms forming the pattern to reflect light emitted from a corresponding light source among the plurality of light sources and entering the light guide plate through the incident surface in a direction in which the pattern is viewable.

The display device includes the light source for each pattern, and thus increases the brightness of the display pattern to improve the viewability of the patterns.

The display device may further include a control circuit that turns on, in accordance with a control signal specifying a display pattern from the plurality of patterns, a light source corresponding to the pattern specified by the control signal among the plurality of light sources.

The display device can thus display an intended pattern selectively from the multiple patterns.

Another aspect of the present invention provides an exhibition apparatus. The exhibition apparatus includes a mount on which an exhibition target is mountable, and a display device located in front of the exhibition target. The display device includes a transparent light guide plate having an incident surface and a first surface facing the exhibition target to display a plurality of patterns viewable in different directions, and at least one light source facing a part of the incident surface. The light guide plate includes, on the first surface of the light guide plate, a plurality of prisms arranged along each of the plurality of patterns. The plurality of prisms have, for each pattern, reflection surfaces that reflect light emitted from the at least one light source and entering the light guide plate through the incident surface in a direction in which the pattern is viewable.

The exhibition apparatus with the above structure can switch patterns to be displayed together with the exhibition target depending on the viewing direction.

DETAILED DESCRIPTION

A display device according to one or more embodiments of the present invention will now be described with reference to the drawings. The display device includes a light guide plate formed from a material that is transparent to light from a light source. The light guide plate has one surface serving as an emission surface facing a viewer. The light guide plate also has one of its side walls surrounding the emission surface serving as an incident surface facing the light source. The light guide plate includes, on the other surface opposite to the emission surface, multiple prisms that reflect light emitted from the light source and entering the light guide plate toward the emission surface. Each prism is included in one of multiple groups. The prisms in each group are arranged to align with the shape of a pattern displayed by the display device. The prisms in different groups reflect light emitted from the light source and entering the light guide plate in different directions. The display device can thus show a different pattern depending on the viewing direction. In the examples described below, for ease of explanation, the term front refers to a direction toward the viewer and the term back refers to the opposite direction.

Figure 1:
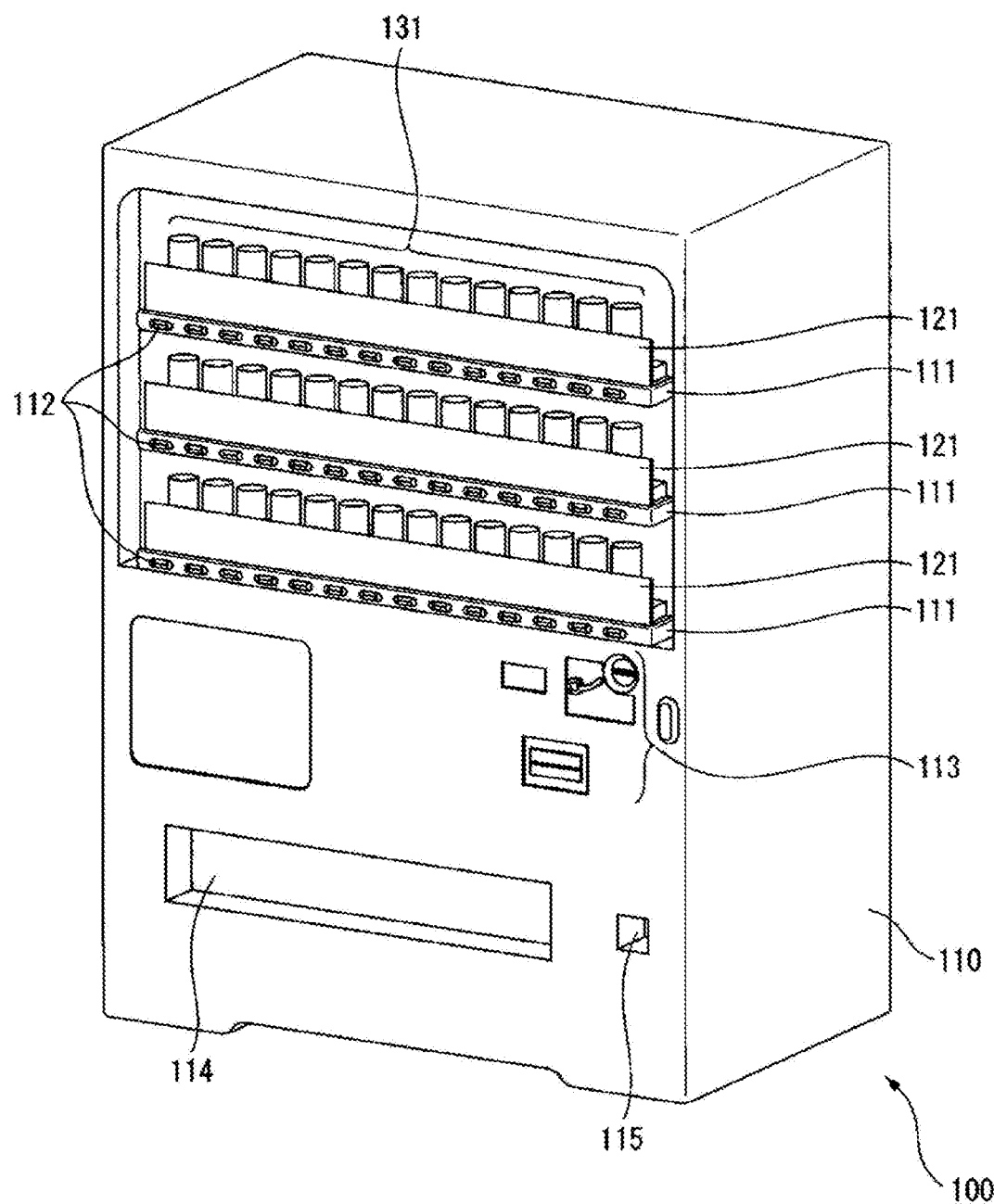
FIG. 1 is a schematic perspective view of a vending machine incorporating display devices according to one embodiment of the present invention.

FIG. 1 is a schematic perspective view of a vending machine incorporating display devices according to one embodiment of the present invention. A vending machine 100, which is an example of an exhibition apparatus, includes a housing 110 and display devices 121. The housing 110 includes three display shelves 111 on the upper half of the front surface, multiple selection buttons 112 located in the lower portion of each display shelf 111, a money slot 113 in the front surface, and a product outlet 114 and a coin return slot 115 located in the lower portion of the front surface. The display devices 121 are located on the front surfaces of the display shelves 111. Each display shelf 111 is an example of a mount on which an exhibition target is mounted. The vending machine 100 also includes, inside the housing 110, a storage (not shown) that stores the same products as those represented by product samples 131 placed on the display shelves 111, a transporting mechanism (not shown) that transports products from the storage to the product outlet 114, and a control circuit (not shown) that centrally controls the vending machine 100. The control circuit is connected to a sensor for recognizing money inserted through the money slot 113, and controls the transporting mechanism to transport a product from the storage to the product outlet 114 when the amount of inserted money is equal to or greater than the price of the product corresponding to a selection button 112 selected from the selection buttons 112 and pressed by a viewer (a user of the vending machine 100 in this example). When the amount of inserted money is greater than the price of the product corresponding to the pressed selection button 112, the control circuit returns the difference between the amount of inserted money and the product price to the coin return slot 115.

Figure 2:
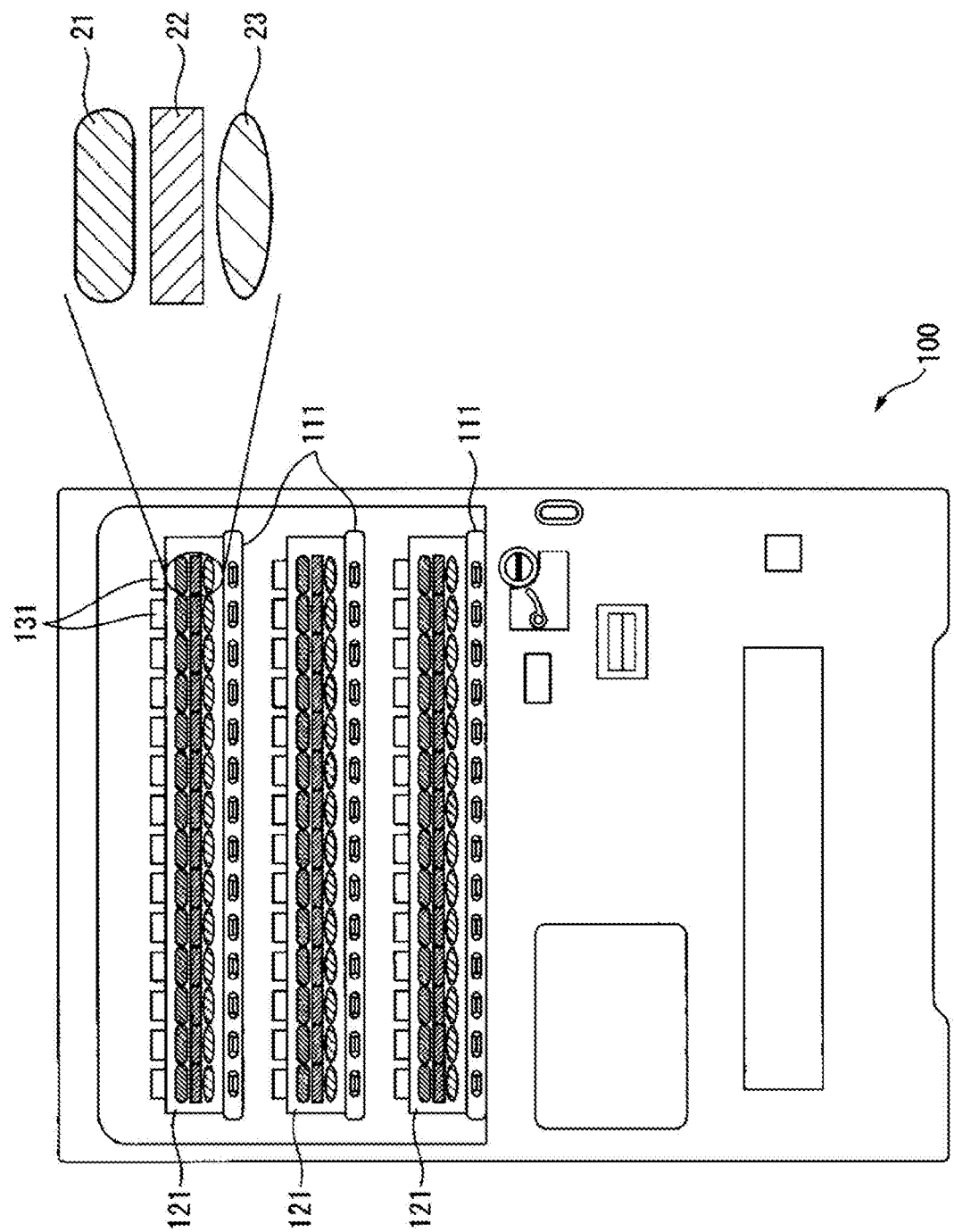
FIG. 2 is a front view of the vending machine.

FIG. 2 is a front view of the vending machine 100. As shown in FIG. 2, each display device 121 can display three vertically-arranged patterns 21 to 23 in front of the product samples 131 mounted on the display shelf 111. The uppermost pattern 21 is viewable by relatively tall viewers, such as adult males, with heights of, for example, 175 cm±10 cm. The middle pattern 22 is viewable by viewers of medium height, such as adult females, with heights of, for example, 155 cm±10 cm. The lowermost pattern 23 is viewable by relatively short viewers, such as children, with heights of, for example, 130 cm±10 cm. Each product sample 131 is an example of an exhibition target. Each of the patterns 21 to 23 may include, for example, a design, a character(s), or a combination of a design and a character(s). The patterns 21 to 23 may be the same or may be different.

Figure 3:
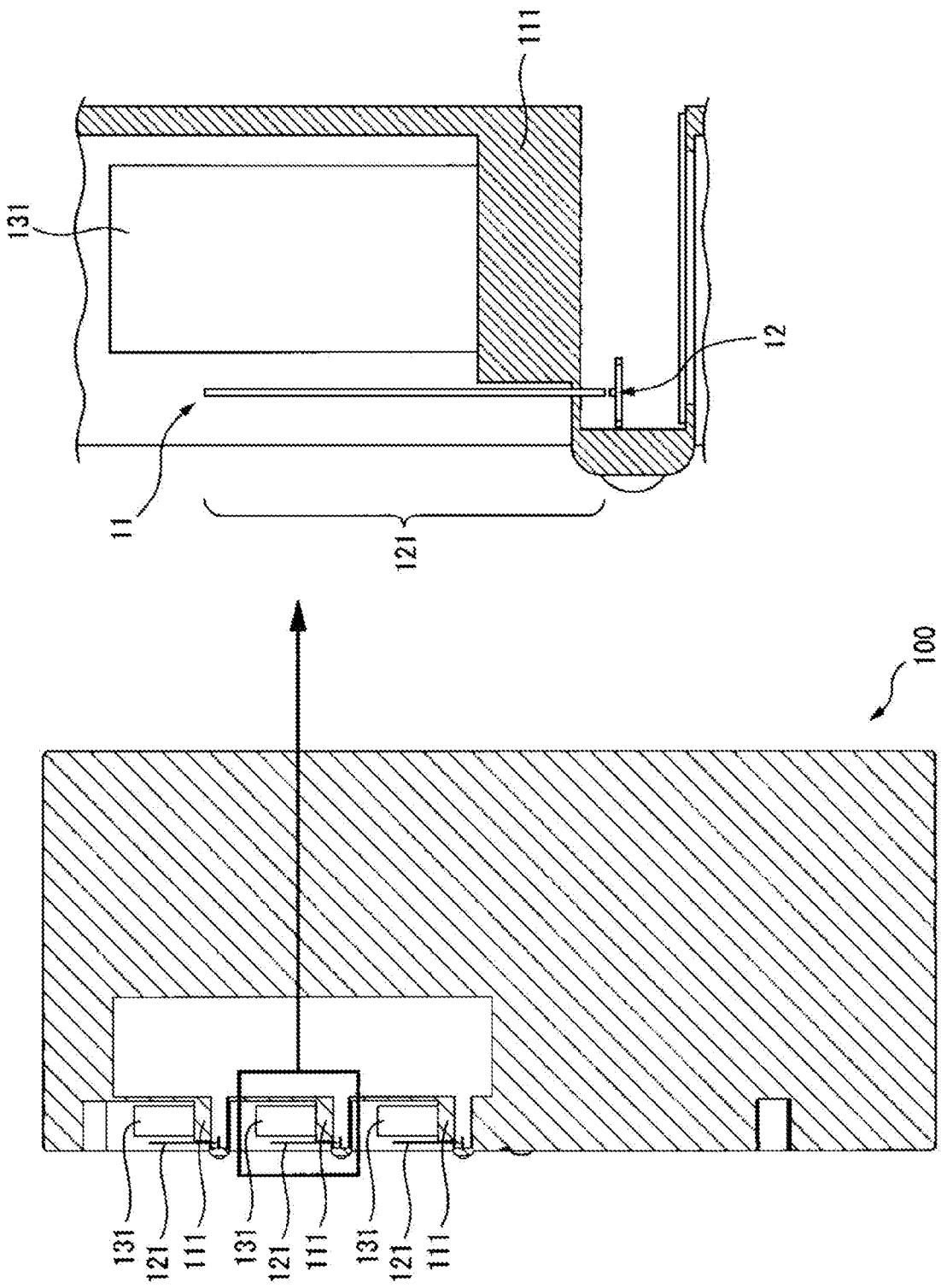
FIG. 3 is a cross-sectional side view of the vending machine showing a part including display shelves.

FIG. 3 is a cross-sectional side view of the vending machine 100 showing a part including the display shelves 111. The display devices 121 have the same structure, and one of the display devices 121 will now be described.

As shown in FIG. 3, the display device 121 is provided for each display shelf 111. Each display device 121 includes a light guide plate 11 and a light source 12.

The light guide plate 11 is transparent to light emitted from the light source 12. The light guide plate 11 is a molded plate formed from a resin transparent to visible light, such as polymethyl methacrylate (PMMA), polycarbonate, or a cyclic olefin polymer. The light guide plate 11 extends substantially parallel to the front surface of the housing 110 in front of the product samples 131 mounted on the display shelves 111. As described above, the light guide plate 11 includes the three vertically-arranged patterns 21 to 23 that are displayable when the light source 12 is turned on. More specifically, while the light source 12 is on, the light guide plate 11 allows light from the light source 12 to propagate within the light guide plate 11 and reflects the light toward the viewer in front of the light guide plate 11 with multiple prisms (described in detail later) arranged on the back surface to form the pattern 21. This allows the viewer to view the pattern 21 with a glowing appearance. In the same manner, the light guide plate 11 reflects light from the light source 12 propagating within the light guide plate 11 toward the viewer in front of the light guide plate 11 with multiple prisms arranged on the back surface to form the pattern 22, thus allowing the viewer to view the pattern 22 with a glowing appearance. Further, the light guide plate 11 reflects light from the light source 12 propagating within the light guide plate 11 to the viewer in front of the light guide plate 11 with multiple prisms arranged on the back surface to form the pattern 23, thus allowing the viewer to view the pattern 23 with a glowing appearance. The transparent light guide plate 11 allows the patterns 21 to 23 to appear, to the viewer in front of the vending machine 100, in a manner superimposed on the product samples 131 located behind the light guide plate 11. The light guide plate 11 will be described in detail later.

The light source 12 includes multiple light emitters that emit visible light. The light emitters have light-emitting surfaces facing an incident surface 11a, which is one of the side walls of the light guide plate 11 and faces downward. The light emitters are arranged in a row in the longitudinal direction of the incident surface 11a. The light emitters in the light source 12 are turned on or off in response to a control signal from the control circuit (not shown) in the vending machine 100. While the light source 12 is on as controlled by the control circuit, light emitted from the light source 12 enters the light guide plate 11 through the incident surface 11a and propagates within the light guide plate 11. The light is then reflected by the multiple prisms arranged on a diffusion surface 11b on the back surface of the light guide plate 11 to form the patterns 21 to 23 and emitted through an emission surface 11c at the front.

The light emitters in the light source 12 are, for example, light-emitting diodes, incandescent lamps, or fluorescent lamps. The light emitted from the light emitters in the light source 12 may be white light, or may be light with a specific color such as red, blue, or yellow.

The light guide plate 11 will now be described in detail.

Figure 4:
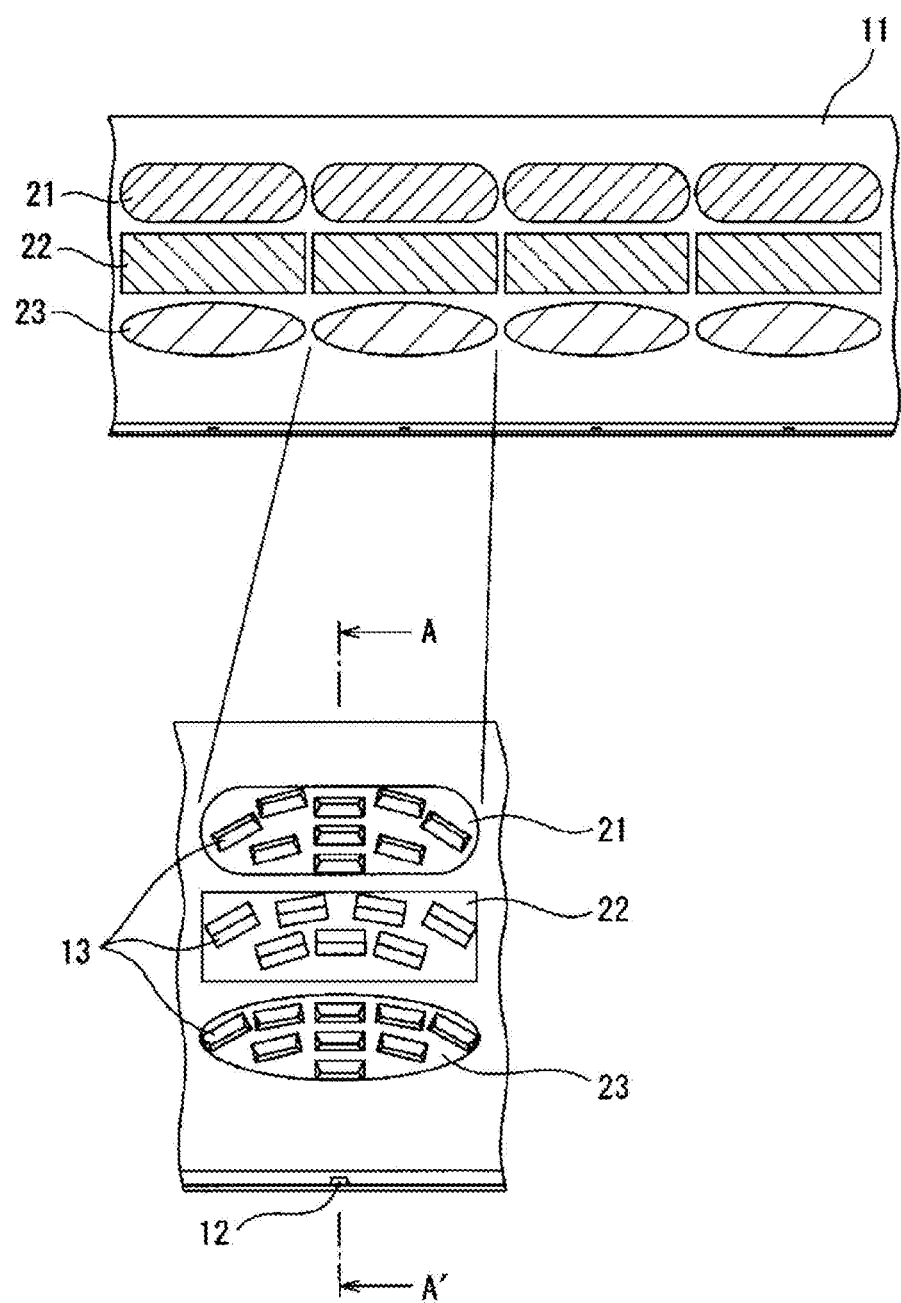
FIG. 4 is an enlarged partial view of a light guide plate as viewed from the front.
Figure 5:
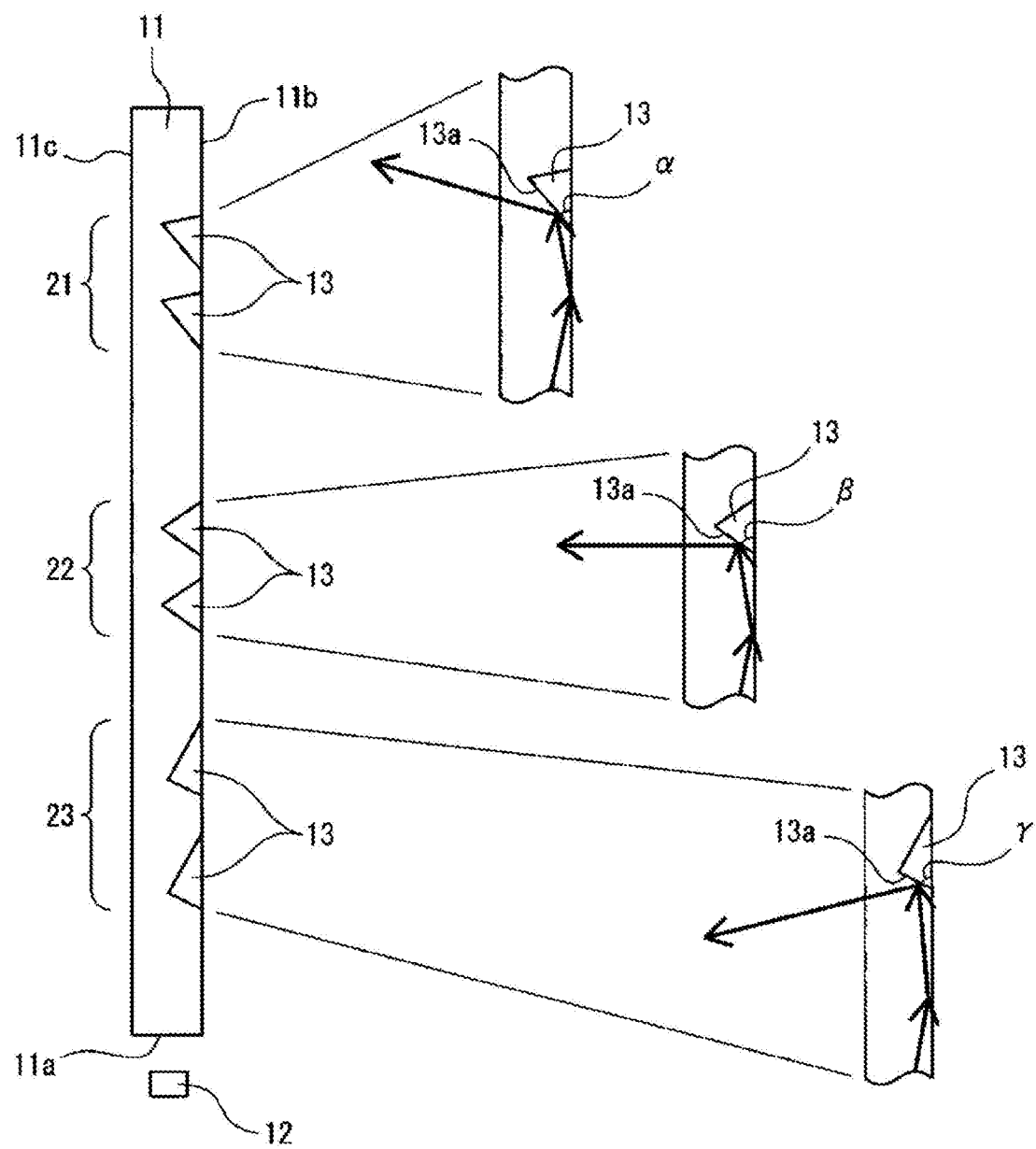
FIG. 5 is a schematic cross-sectional side view of the light guide plate taken along a line indicated by arrows AA' in FIG. 4.

FIG. 4 is an enlarged partial view of the light guide plate 11 as viewed from the front. FIG. 5 is a schematic cross-sectional side view of the light guide plate 11 taken along a line indicated by arrows AA' in FIG. 4. As shown in FIGS. 4 and 5, the lower side surface of the light guide plate 11 serves as the incident surface 11a facing the light source 12. Light from the light source 12 enters the light guide plate 11 through the incident surface 11a. The light from the light source 12 propagating within the light guide plate 11 is then totally internally reflected by multiple prisms 13 located on the diffusion surface 11b at the back of the light guide plate 11. The reflected light is then emitted through the emission surface 11c located at the front of the light guide plate 11 and opposite to the diffusion surface 11b. The prisms 13 are arranged along each of the patterns 21 to 23 to form the patterns 21 to 23. The viewer can thus view one of the patterns 21 to 23 with a glowing appearance on the surface of the light guide plate 11 while the light source 12 is on. In FIGS. 4 and 5, the sizes of the prisms 13 and the thickness of the light guide plate 11 are exaggerated for ease of viewing.

The prisms forming the pattern 21, among the prisms 13, are arranged along the pattern 21 in a staggered manner or in a grid, or randomly at a uniform density. Similarly, the prisms forming the pattern 22, among the prisms 13, are arranged along the pattern 22 in a staggered manner or in a grid, or randomly at a uniform density. Further, the prism forming the pattern 23, among the prisms 13, are arranged along the pattern 23 in a staggered manner or in a grid, or randomly at a uniform density. To provide bright and dark sections in each of the patterns 21 to 23, the prisms 13 may be arranged at different densities at different positions within each pattern, or more specifically, may be more densely arranged in a brighter section in each pattern.

Each prism 13 is, for example, a substantially triangular groove having a predetermined length on the diffusion surface 11b. The predetermined length is set to allow each of the patterns 21 to 23 to include the multiple prisms 13, and is set to, for example, about several tens to several hundreds of micrometers. Each prism 13 has a reflection surface 13a at a predetermined angle (hereafter, slope angle) with the diffusion surface 11b. The reflection surface 13a provides total internal reflection of the light from the light source 12 entering the light guide plate 11 to emit the light through the emission surface 11c.

In the present embodiment, the patterns 21 to 23 are viewable in different directions with respect to the vertical direction, which is the direction orthogonal to the incident surface 11a of the light guide plate 11. The prisms 13 included in different patterns have different slope angles. For example, to have the uppermost pattern 21 among the patterns 21 to 23 viewable by relatively tall viewers, the light reflected by each prism 13 forming the pattern 21 and emitted through the light guide plate 11 is directed relatively upward. In the present embodiment, the light source 12 is located below the light guide plate 11, and thus allows light from the light source 12 to enter the light guide plate 11 and propagate upward within the light guide plate 11. Each prism 13 forming the pattern 21 thus has the reflection surface 13a at a relatively small slope angle α. For example, the slope angle α is set to 30° to 40° to have the pattern 21 viewable on the light guide plate 11 from above the light guide plate 11.

In the same manner, to have the middle pattern 22 among the patterns 21 to 23 viewable by medium height viewers, the light reflected by each prism 13 forming the pattern 22 and emitted through the light guide plate 11 is directed toward the front of the light guide plate 11. Each prism 13 forming the pattern 22 thus has the reflection surface 13a at a slope angle β that is larger than the slope angle α of each prism 13 forming the pattern 21 and smaller than a slope angle γ of each prism 13 forming the pattern 23. For example, the slope angle β is set to about 45° to have the pattern 22 viewable on the light guide plate 11 from the front of the light guide plate 11.

Further, to have the lowermost pattern 23 among the patterns 21 to 23 viewable by relatively short viewers, the light reflected by each prism 13 forming the pattern 23 and emitted through the light guide plate 11 is directed relatively downward. Each prism 13 forming the pattern 23 thus has the reflection surface 13a at a relatively large slope angle γ. For example, the slope angle γ is set to about 50° to have the pattern 23 viewable on the light guide plate 11 from below the light guide plate 11.

The prisms 13 forming each pattern have the reflection surfaces 13a directly facing, on a plane parallel to the diffusion surface 11b, the light emitters in the light source 12 corresponding to the pattern including the prisms 13. Thus, in the present embodiment, the reflection surface 13a of each prism 13 at a predetermined distance from the corresponding light emitter in the light source 12 is sloped substantially parallel to the circumference of a circle having the light emitter at the center and the predetermined distance as the radius.

The prisms 13 arranged in this manner can reflect, selectively from the light entering through the incident surface 11a, light from the corresponding light emitters in the light source 12 in the front direction of the light guide plate 11 with respect to the horizontal direction. Light entering through the incident surface 11a from other than the corresponding light emitters in the light source 12, such as stray light, may be reflected by the prism 13, but is emitted through the emission surface 11c at a relatively large angle with respect to the emission surface 11c in the horizontal direction. Such light is thus less likely to be viewed by the viewer in front of the light guide plate 11. The display device 121 can thus show one of the patterns 21 to 23 to the viewer while the light source 12 is on.

To allow the viewer at a predetermined distance from the vending machine 100 to view the same patterns on the display devices 121 on the display shelves 111, the prisms 13 in each display device 121 forming the same patterns may have the reflection surfaces 13a adjusted at different slope angles. Thus, the prisms 13 included in display devices 121 on higher display shelves 111 have the reflection surfaces 13a at larger slope angles.

The display device described above includes the multiple prisms arranged along each pattern displayable on the light guide plate. The reflection surfaces of the prisms forming each pattern slope in accordance with the direction in which the corresponding pattern is viewable. The display device thus allows each pattern to be viewable in a different direction. The display device can show, as viewed from the front, the pattern displayed on the light guide plate superimposed on objects, such as product samples, located behind the light guide plate.

In one modification, a collimator lens may be located between the incident surface 11a of the light guide plate 11 and the light source 12 to collimate light emitted from the light source 12. In this case, the light emitted from the light source 12 and collimated through the collimator lens propagates within the light guide plate 11 without greatly spreading in the longitudinal direction of the incident surface 11a. Each prism 13 may thus have the reflection surface 13a substantially parallel to the longitudinal direction of the incident surface 11a on the plane parallel to the diffusion surface 11b.

In another modification, the multiple patterns on the light guide plate 11 may be arranged at different positions in the longitudinal direction of the incident surface 11a of the light guide plate 11.

Figure 6:
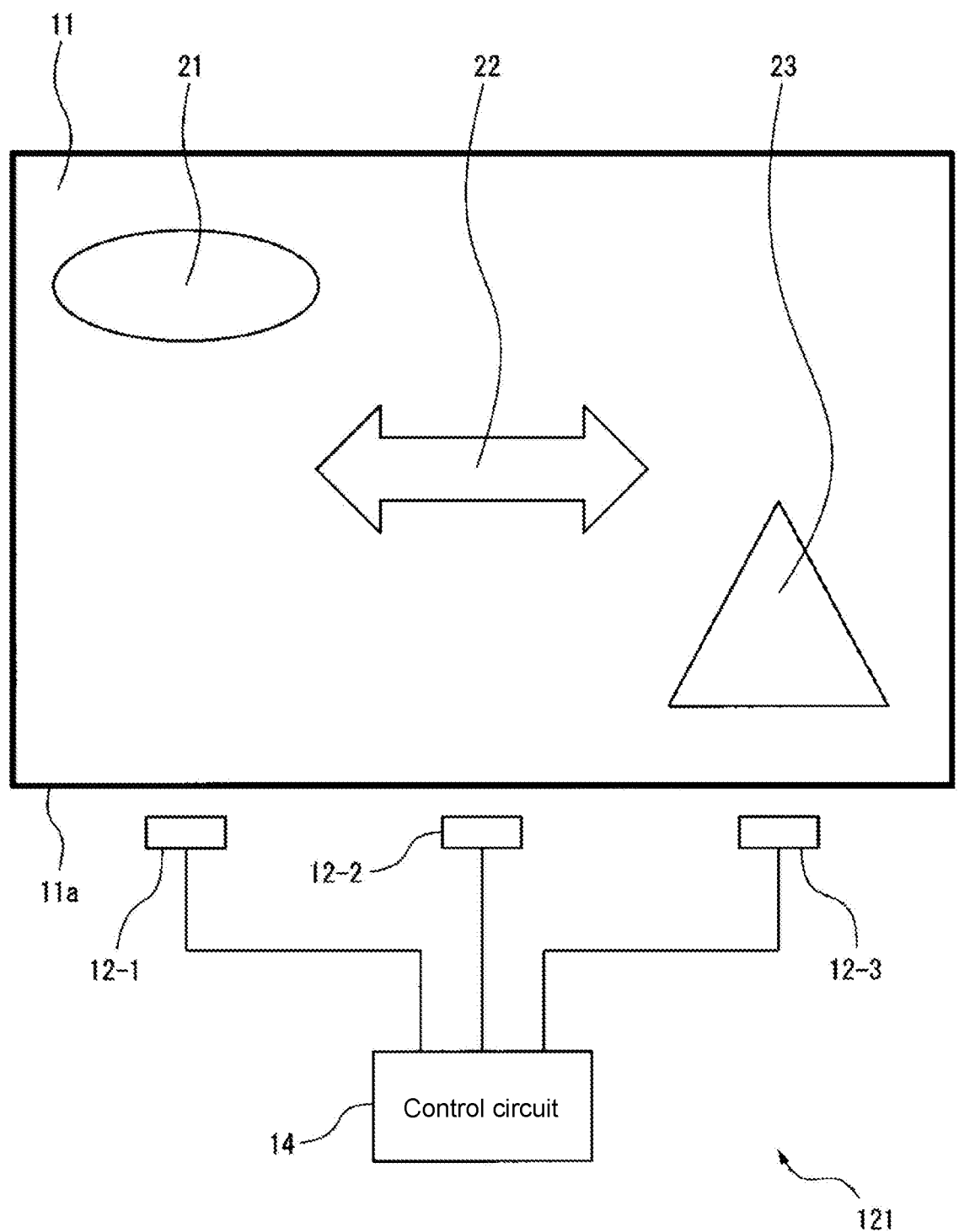
FIG. 6 is a schematic front view of a display device according to a modification.

FIG. 6 is a schematic front view of the display device 121 according to the modification. In this modification, the patterns 21 to 23 are arranged at different positions in the horizontal direction, which is the longitudinal direction of the incident surface 11a of the light guide plate 11. The pattern 21 is leftmost and the pattern 23 is rightmost.

In this case, the display device 121 may include multiple light sources arranged in a row in the longitudinal direction of the incident surface 11a of the light guide plate 11. Each light source is located, for example, at substantially the same position as the corresponding pattern in the longitudinal direction of the incident surface 11a of the light guide plate 11 to illuminate the corresponding pattern. In this example, three light sources 12-1 to 12-3 are arranged in a row in the longitudinal direction of the incident surface 11a of the light guide plate 11. The light source 12-1 corresponds to the pattern 21, the light source 12-2 corresponds to the pattern 22, and the light source 12-3 corresponds to the pattern 23. The display device 121 may further include a control circuit 14 that controls the on-off state of each light source. The control circuit 14 turns on one of the light sources and turns off the other light sources to display, selectively from the multiple patterns, the pattern corresponding to the on-state light source. For example, the control circuit 14 displays the pattern 21 selectively from the patterns 21 to 23 by turning on the light source 12-1 and turning off the other light sources. In this modification as well, the reflection surfaces 13a of the prisms 13 forming each pattern may have a slope angle to allow the patterns to be viewable in different directions.

The vending machine 100 may further include a sensor (not shown) for detecting a viewer in front of the vending machine 100. The control circuit in the vending machine 100 may recognize the position of the viewer's head based on a sensor signal from the sensor, generate a control signal specifying, from the patterns on the display device 121, a pattern viewable by the viewer to show the pattern on the display device 121 in accordance with the recognized position of the head, and output the control signal to the display device 121. The control circuit in the vending machine 100 may determine the display pattern corresponding to the recognized position of the head by, for example, referring to a reference table indicating a range for the position of the head corresponding to each display pattern. The reference table is prestored in the memory in the control circuit. The control circuit 14 in the display device 121 displays the pattern viewable by the viewer selectively from the multiple patterns by turning on the light source corresponding to the pattern specified by the received control signal.

The sensor is, for example, an image sensor installed to cover an imaging range in front of the vending machine 100. The sensor signal is an image. The control circuit in the vending machine 100 may use a discriminator preliminary trained to detect a person's head in an image received from the image sensor to detect the position of the viewer's head in the image. The position of the viewer's head in the image corresponds to the direction of the head viewed from the image sensor. Thus, the control circuit in the vending machine 100 may determine the position of the viewer's head in the real space based on the position of the viewer's head in the image and the estimated distance between the vending machine 100 and the viewer. The discriminator may be, for example, an adaBoost discriminator, a support vector machine, or a neural network.

The display device according to still another modification may have the patterns viewable in different directions with respect to the direction parallel to the longitudinal direction of the incident surface 11a of the light guide plate 11. In this case, for each pattern, the angle between the direction in which the reflection surface 13a of each prism 13 forming the pattern directly faces and the direction from the reflection surface 13a toward the light source 12 may be set in accordance with the direction in which the corresponding pattern is viewable. For example, to have a pattern viewable on the light guide plate 11 from leftward with respect to the front direction of the light guide plate 11, the reflection surface 13a of each prism 13 forming the pattern is adjusted to face leftward with respect to the direction directly facing the light source 12. In contrast, to have a pattern viewable on the light guide plate 11 from rightward with respect to the front direction of the light guide plate 11, the reflection surface 13a of each prism 13 forming the pattern is adjusted to face rightward with respect to the direction directly facing the light source 12.

The number of patterns displayable by the display device is not limited to the number of patterns in the above embodiment or modifications, and may be set as appropriate depending on the use of the display device. The display device according to the above embodiment or modifications may be incorporated in various devices other than a vending machine.

As described above, those skilled in the art can make various changes in accordance with embodiments implemented within the scope of the present invention.

The invention claimed is:

1. A display device, comprising:
   a transparent light guide plate comprising an incident surface, the light guide plate being configured to display a plurality of patterns viewable in different directions;
   a plurality of light sources each facing a corresponding part of the incident surface; and
   a control circuit configured to detect, based on a sensor signal obtained from a sensor for detecting a viewer, a position of a head of the viewer and turn on, among the plurality of light sources, a light source corresponding to a pattern viewable from the detected position of the head of the viewer among the plurality of patterns,
   wherein the light guide plate comprises, on a first surface of the light guide plate, a plurality of prisms arranged along each of the plurality of patterns, and the plurality of prisms comprise, for each pattern, reflection surfaces configured to reflect light emitted from a corresponding light source among the plurality of light sources and entering the light guide plate through the incident surface in a direction in which the pattern is viewable.

2. The display device according to claim 1, wherein
each of the patterns is viewable in a different direction with respect to a direction orthogonal to the incident surface, and each of the patterns comprises an angle between the reflection surface of each of the plurality of prisms forming the pattern and the first surface that is set in accordance with the direction in which the pattern is viewable.

3. The display device according to claim 2, wherein
the plurality of light sources is arranged in a longitudinal direction of the incident surface, and
the plurality of prisms is arranged to allow, for each pattern, the reflection surface of each of the plurality of prisms forming the pattern to reflect light emitted from a corresponding light source among the plurality of light sources and entering the light guide plate through the incident surface in a direction in which the pattern is viewable.

4. The display device according to claim 1, wherein
each of the patterns is viewable in a different direction with respect to a direction parallel to the incident surface, and each of the patterns comprises an angle between a direction in which the reflection surface of each of the plurality of prisms forming the pattern directly faces and a direction from the reflection surface toward the at least one light source that is set in accordance with the direction in which the pattern is viewable.

5. The display device according to claim 4, wherein
the plurality of light sources is arranged in a longitudinal direction of the incident surface, and
the plurality of prisms is arranged to allow, for each pattern, the reflection surface of each of the plurality of prisms forming the pattern to reflect light emitted from a corresponding light source among the plurality of light sources and entering the light guide plate through the incident surface in a direction in which the pattern is viewable.

6. The display device according to claim 1, wherein
the plurality of light sources is arranged in a longitudinal direction of the incident surface, and
the plurality of prisms is arranged to allow, for each pattern, the reflection surface of each of the plurality of prisms forming the pattern to reflect light emitted from a corresponding light source among the plurality of light sources and entering the light guide plate through the incident surface in a direction in which the pattern is viewable.

7. An exhibition apparatus, comprising:
a mount on which an exhibition target is mountable;
a display device located in front of the exhibition target;
a sensor configured to detect a viewer of the exhibition target and output a sensor signal representing a position of a head of the viewer; and
a control circuit,
wherein the display device comprises
a transparent light guide plate comprising an incident surface and a first surface facing the exhibition target to display a plurality of patterns viewable in different directions, and
a plurality of light sources each facing a corresponding part of the incident surface,
the light guide plate comprises, on the first surface of the light guide plate, a plurality of prisms arranged along each of the plurality of patterns, and the plurality of prisms comprise, for each pattern, reflection surfaces configured to reflect light emitted from a corresponding light source among the plurality of light sources and entering the light guide plate through the incident surface in a direction in which the pattern is viewable, and
the control circuit detects the position of the head of the viewer based on the sensor signal and turns on, among the plurality of light sources, a light source corresponding to a pattern viewable from the detected position of the head of the viewer among the plurality of patterns.

* * * * *